US012654274B2

(12) United States Patent
Cocksedge et al.

(10) Patent No.: US 12,654,274 B2
(45) Date of Patent: Jun. 16, 2026

(54) MOTORISED MEASUREMENT ARM APPARATUS FOR A MACHINE TOOL

(71) Applicant: RENISHAW PLC, Wotton-under-Edge (GB)

(72) Inventors: David Andrew Cocksedge, Wotton-under-Edge (GB); Oliver Jacques Andrew Byrne, Wotton-under-Edge (GB); Matthew Adam Stoodley, Wotton-under-Edge (GB); Sandor Marton, Wotton-under-Edge (GB)

(73) Assignee: RENISHAW PLC, Wotton-under-Edge (GB)

( * ) Notice: Subject to any disclaimer, the term of this patent is extended or adjusted under 35 U.S.C. 154(b) by 201 days.

(21) Appl. No.: 18/288,133

(22) PCT Filed: Apr. 20, 2022

(86) PCT No.: PCT/GB2022/050987
§ 371 (c)(1),
(2) Date: Oct. 24, 2023

(87) PCT Pub. No.: WO2022/234248
PCT Pub. Date: Nov. 10, 2022

(65) Prior Publication Data
US 2024/0198474 A1 Jun. 20, 2024

(30) Foreign Application Priority Data
May 4, 2021 (EP) ..................................... 21275051

(51) Int. Cl.
*B23Q 17/22* (2006.01)
*B23Q 17/09* (2006.01)

(52) U.S. Cl.
CPC ......... *B23Q 17/22* (2013.01); *B23Q 17/0914* (2013.01); *B23Q 2717/00* (2013.01)

(58) Field of Classification Search
CPC ............................................ B23Q 17/22–2291
See application file for complete search history.

(56) References Cited

U.S. PATENT DOCUMENTS

| | | | |
|---|---|---|---|
| 4,718,175 A | 1/1988 | Babel | |
| 5,446,970 A | 9/1995 | McMurtry et al. | |

(Continued)

FOREIGN PATENT DOCUMENTS

| | | |
|---|---|---|
| CN | 105108578 A | 12/2015 |
| CN | 108015548 A | 5/2018 |

(Continued)

OTHER PUBLICATIONS

Braddick, H.J.J., "Mechanical Design of Laboratory Apparatus," 1960, Institute of Physics, Catalogue No. 650/4, pp. 9-31.

(Continued)

*Primary Examiner* — Alexander A Mercado
(74) *Attorney, Agent, or Firm* — Oliff PLC

(57) ABSTRACT
A motorised measurement arm apparatus for a machine tool includes a base for attachment to the machine tool and an arm member extending from the base for holding one or more sensors. The arm member is moveable relative to the base between a stowed position and an operative position, the operative position being defined by engagement of a mechanical stop arrangement. The apparatus also has a motor for moving the arm member relative to the base and a motor controller for energising the motor to move the arm member relative to the base. The motor controller is configured to energise the motor when the arm member is in the operative position to maintain engagement of the mechanical stop arrangement. An operative position having improved repeatability is thus obtained.

13 Claims, 7 Drawing Sheets

(56) References Cited

U.S. PATENT DOCUMENTS

Figures 1, 2:
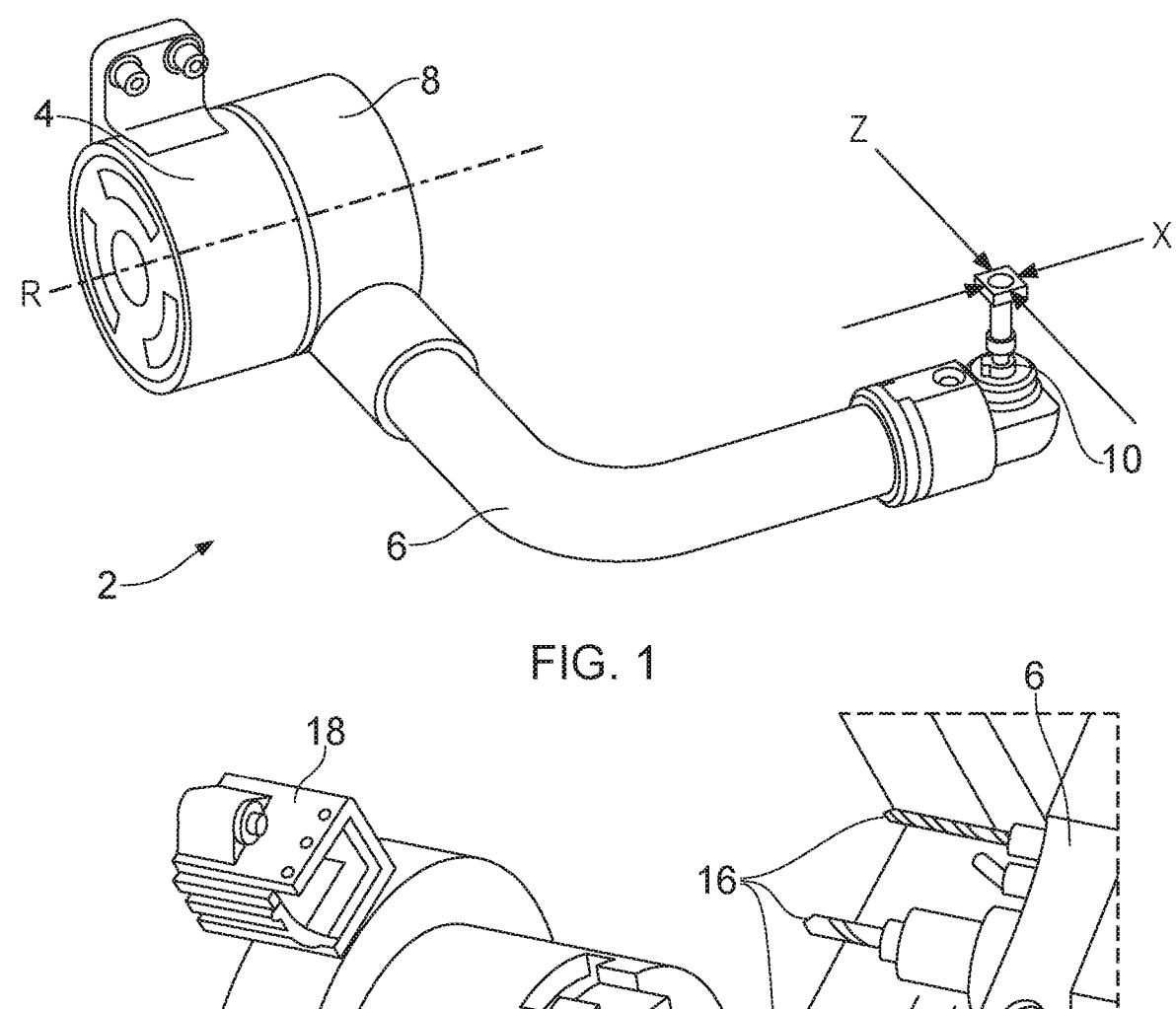

| 6,060,855 | A | 5/2000 | Matsuhashi |
| 6,519,863 | B1 | 2/2003 | McMurtry et al. |
| 8,065,491 | B2 | 11/2011 | Shpeisman et al. |
| 2005/0025592 | A1 | 2/2005 | Cantlon |
| 2006/0037443 | A1 | 2/2006 | D'Antonio |
| 2018/0126511 | A1 | 5/2018 | Dawidziak et al. |

FOREIGN PATENT DOCUMENTS

| DE | 29722951 | U1 | 2/1998 |
| EP | 0 207 481 | B1 | 10/1989 |
| JP | H10-309652 | A | 11/1998 |
| JP | H11-33881 | A | 2/1999 |
| JP | 2008-500200 | A | 1/2008 |
| JP | 2012-116448 | A | 6/2012 |
| JP | 2015-006717 | A | 1/2015 |
| JP | 2016-193469 | A | 11/2016 |
| WO | 2005/113180 | A1 | 12/2005 |

OTHER PUBLICATIONS

Oct. 6, 2021 Extended Search Report issued in European Patent Application No. 21275051.7.
Jul. 5, 2022 International Search Report issued in International Patent Application No. PCT/GB2022/050987.
Jul. 5, 2022 Written Opinion of the International Searching Authority issued in International Patent Application No. PCT/GB2022/050987.

FIG. 3A                    FIG. 3B

MOTORISED MEASUREMENT ARM APPARATUS FOR A MACHINE TOOL

The present invention relates to a motorised measurement arm apparatus for a machine tool, and in particular to an improved motorised measurement arm apparatus that is configured to move at least one measurement sensor into and out of an operative position where measurements are taken.

It is known to mount a measurement arm apparatus on a machine tool that allows a measurement sensor, such as a tool measurement device or tool setting probe, to be moved into an operative position as and when required. For example, the measurement sensor may be moved into the working volume of the machine tool periodically to measure or inspect a cutting tool but moved away into an inoperative or stowed position when such tool measurements are not required. Known measurement arms may be manually moveable by a user or they may be motorised to allow automated motion under the control of the machine tool.

U.S. Pat. No. 5,446,970 describes one example of a motorised measurement arm apparatus. The protruding measurement arm member is rotatable relative to a fixed base member and a kinematic stop is used to define an operative position of the arm member. A motor and worm drive are used to rotate the arm member into engagement with the kinematic stop and a complex arrangement of tension springs is provided to maintain such engagement when the motor is deactivated after the operative position is reached.

U.S. Pat. No. 6,519,863 describes another measurement arm that comprises a stop which kinematically defines an operative or index position between the fixed member and the arm member. An axial bias spring and detent plate are used to provide a rotational force that maintains engagement of the stop after the arm member is moved into the operative position. This provides a more compact and robust apparatus than the tension spring arrangement of U.S. Pat. No. 5,446,970.

The present inventors have found that in certain circumstances there can be a degradation of repeatability in the index or operative position that is provided using the arrangements of U.S. Pat. Nos. 5,446,970 and 6,519,863. For example, in the presence of machine vibrations or when the arm is driven hard into the operative position (such as when it is carrying a heavy sensor) the repeatability of the operative position can be compromised. Any such variations in the operative position will act as a source of uncertainty for any position measurements that are taken using a sensor carried by the measurement arm apparatus.

According to the present invention, there is provided a motorised measurement arm apparatus for a machine tool, comprising
    a base for attachment to the machine tool,
    an arm member extending from the base for holding one or more sensors, the arm member being moveable relative to the base between a stowed position and an operative position, the operative position being defined by engagement of a mechanical stop arrangement,
    a motor for moving the arm member relative to the base, and
    a motor controller for energising the motor to move the arm member relative to the base,
    wherein the motor controller is configured to energise the motor when the arm member is in the operative position to maintain engagement of the mechanical stop arrangement.

The present invention thus provides a motorised measurement arm apparatus for a machine tool, such as a metalcutting machine, machining centre, grinding machine, milling machine or lathe etc. The apparatus comprises a base that can be attached to a suitable part of the machine tool. For example, the base may include a plurality of holes that enable attachment of the apparatus to the bed, casing or frame of a machine tool using bolts or the like. Any such attachment is preferably sufficiently rigid to prevent any movement of the base relative to the machine tool. An arm member is also provided that extends from the base. As described below, a proximal end of the arm member may be attached to the base via a rotary joint thereby allowing the arm member to be rotated between the stowed and operative positions. The arm member is also configured to hold one or more sensors, such as tool measurement or tool setting devices. The sensor(s) may be attached at or near the distal end of the arm member, or at any appropriate location along the arm member. As also explained below, the arm member may be substantially straight or it may include one or more angled portions. In a preferred embodiment, the arm member is L-shaped with sensors attached near its distal end.

The arm member can be moved between a stowed position and an operative position. The arm member may also be able to adopt other positions (e.g. one or more intermediate positions). The motor, under control of the motor controller, is used to drive the arm member between the stowed and operative positions. In a preferred embodiment, the motor rotates the arm member between the stowed and operative positions. The motor controller may further be interfaced to the controller of an associated machine tool to provide automated control of the apparatus.

The mechanical stop arrangement becomes engaged when the arm member is in the operative position. The mechanical stop arrangement may, for example, include first part or parts of the arm member configured to engage with second part or parts of the base. As explained below, in a preferred embodiment this mechanical stop arrangement may comprise a detent mechanism that provides a repeatable (e.g. kinematically defined) operative position. In use, the operative position is arranged such that a sensor attached to the arm member is held in a location within the machine tool where it can be used to perform a required measurement. For example, the operative position may locate a tool measurement sensor in a position within the working volume of the machine tool that is suitable for tool measurement. It is important to note that the motorised measurement arm apparatus itself does not perform any object measurements, but it is arranged to suitably position a sensor that is held by the arm member in the operative position prior to measurements being taken using that sensor. In particular, the motorised measurement arm apparatus is configured to retain a suitable sensor (e.g., a tool measurement sensor) that can be used to acquire measurements (e.g., of a tool) when the sensor has been placed in the operative position. As explained below, the arm member may thus include a sensor mount that allows an appropriate sensor to be attached to the arm member.

The arm member can be moved (e.g. rotated by the motor) back and forth between the operative position and the stowed position. Movement to the stowed position may, for example, remove the arm member and any attached sensor from the working volume of the machine tool to ensure they do not interfere with cutting tools, workpieces etc. The stowed position may also be termed an inoperative or non-measurement position because any sensor attached to the arm member is typically not used when it is in this position. The stowed position adopted by the arm member does not need to be repeatable, although it could be, as measurements are not intended to be taken when the arm member is in such a position. It should be noted that moving the arm member into the stowed position may retract the arm member into a housing or cavity that has a door or shutter that can be then closed to protect the measurement arm apparatus during any cutting operations. Alternatively, the stowed position may simply locate the arm member away from a certain region within the machine tool enclosure where it could interfere with other operations and/or it may move any attached sensors into a protective housing or pocket.

In accordance with the present invention, the motor itself is used to help maintain engagement of the mechanical stop arrangement after the arm member has been driven into the operative position. Instead of simply turning off the motor after the arm member has been moved from the stowed position to the operative position, the motor remains energised to help maintain engagement of the mechanical stop arrangement. The electrical power (e.g. electrical current) supplied to the motor when it is in the operative position is preferably selected to be sufficiently low to stop excessive heat generation by the motor. This helps prevent damage to the motor and also minimises thermal expansion effects that might otherwise affect the operative position of the arm member. The motor thus acts to apply a force (torque) to maintain engagement of the mechanical stop, but without any further rotation of the motor. In other words, the motor stalls when the arm member is in the operative position but remains energised so as to provide a holding torque or force. The electrical energy supplied to the motor is preferably reduced after the mechanical stop is engaged, thereby reducing excessive motor heating and/or preventing damage to the motor. It should be noted that the force applied by the motor to maintain engagement of the mechanical stop may be in addition to other forces (e.g. spring forces, gravity etc) that may also act to keep the mechanical stop arrangement engaged.

The arrangement of the present invention has been found to have a number of advantages. In particular, it has been found to provide a more repeatable operative position than that obtained using purely passive (spring based) mechanical means to maintain engagement of a mechanical stop. This, in turn, reduces the measurement uncertainty associated with taking multiple measurements (e.g. tool measurements) using a sensor attached to such a measurement arm apparatus. In other words, using the motor to apply a torque to maintain engagement of the mechanical stop arrangement when the arm member is in the operative position reduces the changes in the position of the arm member that may occur (e.g. due to vibrations etc) in prior art apparatus. Improved metrology accuracy is thus provided, especially when the arm apparatus is used to carry heavy sensors and/or is mounted in certain orientations.

Advantageously, the motor controller is configured to supply a drive-in current to the motor for a first time period after initial engagement of the mechanical stop arrangement during movement of the arm member into the operative position. The motor controller is conveniently also configured to supply a holding current to the motor after the first time period to maintain firm (positive) engagement of the mechanical stop arrangement. In other words, the motor may draw a drive-in current when the mechanical stop arrangement initially engages when the operative position is reached. In particular, a drive-in current limit may be applied when the motor stalls. The drive-in current may be quite high (i.e. high enough to damage the motor or cause it to overheat if it is maintained for too long). After the first time period, which may be of the order of a few seconds or less, a holding current is supplied to the motor that provides a holding force or torque. The first time period may be at least 0.1 seconds, or at least 0.25 seconds, or at least 0.5 seconds, or at least 1 second. The first time period may be less than 10 seconds, or less than 5 second or less than 1 second. The holding current limit is then maintained whilst the operative position is adopted and is thus preferably low enough to prevent excessive motor heating or motor damage.

The holding current is advantageously less than the drive-in current. The motor controller may also be configured to reduce the current supplied to the motor from the drive-in current to the holding current over a second time period. There may be a rapid reduction from the drive-in current to the holding current (i.e. the second time period may be very short). Advantageously, there is a more gradual reduction from the drive-in current to the holding current. For example, the second time period may be at least 0.1 seconds, or 0.25 seconds, or 0.5 seconds, or 1 second. It has been found to be particularly advantageous to configure the motor controller to gradually ramp down the current supplied to the motor from the drive-in current to the holding current over the second time period. In other words, the drive current may be reduced in increments or steps from the drive-in current to the holding current. This allows the good engagement of the mechanical stop that is attained when the relatively high drive-in current is applied to be maintained as the current is reduced to the holding current. In other words, a substantially constant engagement force (torque) can be maintained and backward, potentially inconsistent, motion of the drive-train can be substantially prevented.

Advantageously, the motor controller is configured to monitor the current supplied to the motor. For example, the motor controller may comprise a current measurement device or circuit. In this way, an increased current that can occur as the mechanical stop is engaged (i.e. the drive-in current) can be sensed by the motor controller. Monitoring the current can also be used to determine if the arm member has made (e.g. unintentional) contact with an external object. For example, if the arm member is moving any sudden increase in the current drawn by the motor may indicate the arm member has hit an obstruction. In such an example, the motor may be stopped to prevent damage or injury. As explained below, if an encoder is also provided to measure the orientation of the arm member it is also possible to use the encoder output to distinguish between the arm reaching the operative position and the arm contacting an unexpected obstruction.

It is also possible to monitor the current supplied to the motor when the arm member is in the operative position. If the motor starts to draw a current that is higher than the expected holding current it can be determined that an external force is being applied to the arm member. This external force may be a machine operator attempting to manually move the arm member from the operative position (e.g. if the machine tool is being reset after a power failure, crash or the like). In response to establishing that such an external force is being applied to the arm member for a certain duration, the motor controller may turn off the holding current to allow the arm member to be moved manually (i.e. released) without having to overcome the holding force applied by the motor. In particular, the motor controller is preferably configured to de-energise the motor if an external force is applied to the moveable arm. It should, however, be remembered that transient forces may arise due to vibration and hence the arm member is preferably only released if an external force of a certain magnitude is continually applied for a certain duration.

As explained in more detail below, the apparatus may include an encoder (e.g. a rotary encoder) to measure the position of the moveable arm. The motor controller is advantageously configured to monitor the output of the rotary encoder and determine therefrom if there are any unexpected changes in the position or speed of movement of the arm member that are indicative of an external force being applied to the arm member. In other words, the measurements taken by the encoder may be used to sense any unexpected changes in the position (e.g. if the arm member is expected to be stationary) or the speed of arm member movement (e.g. if the arm is moving between the operative and stowed positions) that have arisen from an external force being applied to the arm. The motor control may, instead of or in addition to monitoring changes to the supplied current, use any such unexpected changes in position or speed as measured by the encoder to indicate an external force has been applied to the arm member whereupon the motor may be de-energised.

The mechanical stop arrangement preferably defines a repeatable position of the arm member relative to the base when the arm member is in the operative position. It is preferred that the stop mechanism is provided internally within the motorised measurement arm apparatus, although a separate external stop (e.g. directly attached to a part of the machine tool) could alternatively be provided. In a preferred embodiment, the mechanical stop arrangement comprises a first portion attached to the arm member and a second portion attached to the base. The first and second portions may each comprise a plurality of elements (e.g. three elements) that engage to define the repeatable relative position when they are brought into engagement.

Advantageously, the first and second portions provide, when engaged, a kinematically defined relative position. In other words, the first and second portions define an operative position that is kinematically constrained. This kinematic constraint means that each of the six degrees of freedom of motion between the first and second portions is constrained by only one point of contact.

This defines a highly repeatable relative position between the first and second portions. Kinematic connections and mounts of various types are known, and described in (for example) H J J Braddick, "Mechanical Design of Laboratory Apparatus" Chapman and Hall, London, 1960. Such a kinematic constraint may include quasi-kinematic or partly degenerate kinematic mounts.

The operative position is defined by engagement of a mechanical stop arrangement and this preferably allows the arm member to attain a highly repeatable position relative to the base. In the stowed position, there is typically no need to provide a repeatable position as no positional measurement are typically taken with the arm member in the stowed position. It would, however, be possible to also define a repeatable stowed position (e.g. by providing a further mechanical stop arrangement). Any repeatable position provided in the stowed position may be defined with a lower precision than that provided in the operative position.

The motor of the apparatus may be of any suitable type. Advantageously, the motor comprises a brushless motor and/or the motor may be a direct current (DC) motor. The motor may comprise a stepper motor. The apparatus may also include a gearbox (i.e. the motor may impart motion to the arm member via a gearbox). The arm member may move linearly relative to the base. In a preferred embodiment, the arm member is attached to the base by a rotary joint. The arm member may thus be rotated by the motor between the stowed and operative positions. The rotation may be directly driven or driven via a gearbox. Any suitable angle of rotation may be provided between the operative and stowed positions. Advantageously, the stowed and operative positions are separated by a rotation of more than 45°, or more than 60°, or at least 90°. The amount of angular rotation between the stowed and operative positions may be adjustable. For example, the absolute angle of at least one of the stowed position and the operative position may be adjustable. This adjustment may be made by a user. Alternatively, the angles defining the stowed and/or operative positions may be set during manufacture or by an installation engineer.

Advantageously, the arm apparatus comprises at least one rotary encoder. The rotary encoder may be an optical encoder, an inductive encoder, or a magnetic encoder etc. The rotary encoder may be used to measure rotation of the arm member relative to the base. An encoder may be provided with or integrated into the motor. For example, the motor may include an integrated encoder (e.g. comprising one or more Hall sensor elements) to measure the amount of motor rotation.

Alternatively, or additionally, an encoder may be mounted to a suitable part of the measurement arm apparatus to measure the relative position (e.g. angle) of the arm member relative to the base. The motor controller may receive position information from the encoder, thereby enabling it to act in response to the relative position (e.g. angle) of the arm member relative to the base. It is then possible to slow the speed of the arm member as it approaches the operative position or the stowed position. This can reduce damage or wear to the apparatus and also reduces vibrations or oscillations of the arm member that may otherwise occur on reaching the operative position. A higher speed of arm member movement is also possible if this can be slowed prior to reaching the desired position.

In a preferred embodiment, the base comprises a housing that houses the rotary joint, the motor and the mechanical stop arrangement. The arm member may then extend from the housing. A rotatable hub may be provided for carrying the arm member. In a preferred embodiment, the motorised measurement arm apparatus may include a detent mechanism as described in U.S. Pat. No. 6,519,863, the contents of which are hereby incorporated by reference. In particular, the base may include a hub having a moveable portion with three radial (outward) projections which rotate within an aperture of the base which also has three inward radial projections. Together the projections may provide the mechanical stop that defines the operative position but also defines the stowed position of the arm member. The aperture may also have three axial raised areas on an annular ledge which support an annular shoulder on the hub. In this manner, there are six points of contact between the hub and base member in each of the operative and stowed positions. A spring biasing arrangement may be provided that comprises a detent plate secured to the aperture and a planar spring secured to the hub by its central region. Ball bearings may be loosely retained in two opposite lugs on the spring and run around the detent plate between two pairs of detent holes. In the operative and stowed positions, the ball bearings rest on radially-extending edges (e.g. see FIG. 5 of U.S. Pat. No. 6,519,863) of the detent holes and thus the axial force of the spring also provides a component of force in a tangential direction, thereby causing a rotational force.

As mentioned above, the motorised measurement arm apparatus may include a gearbox connecting the motor to the arm member. This allows the rotation of the motor to be converted to provide a desired speed and torque. The gear ratio may be fixed or variable. The gear ratio may be set to provide a torque that is sufficient to rotate the arm member (plus any sensors mounted to the arm member) between the stowed and operative positions at the required speed. The apparatus preferably does not include a clutch or similar mechanism. The motor is preferably arranged to stall (i.e. not rotate) when energised to maintain engagement of the mechanical stop arrangement (e.g. by application of the holding current).

Advantageously, the base comprises an attachment mechanism for securing the apparatus to the machine tool. For example, the base may include an attachment mechanism that comprises a plurality of holes to enable attachment to a machine tool using bolts or the like. Alternatively, other attachment means (e.g. bespoke mounts, mounting blocks etc) may be provided. The arm member preferably includes at least one sensor mount to which a sensor can be attached. It is preferred that the sensor is removably mountable to the sensor mount. At least one sensor mount may be provided at or near the distal end of the arm member. Each sensor mount may be arranged to receive one or more sensors. For example, the sensor mount may be configured to allow attachment of a tool measurement sensor (e.g. a non-contact or contact tool setting or measurement device) to the moveable arm. The motorised measurement arm apparatus may also comprise a sensor that is mounted (e.g., removably mounted) to the arm member (e.g., via a sensor mount of the arm member).

The motorised measurement arm apparatus may consist of only one axis of motion (e.g. rotation) between the base and the distal end of the arm member. The apparatus is preferably not an articulated robot or the like. Only the operative position may be suitable for measurement purposes (i.e. the stowed and any other positions may not be sufficiently well defined to allow measurement with an acceptable level of accuracy or repeatability). The apparatus may include other features to allow use of attached measurement sensors. For example, appropriate cabling may be provided (e.g. routed through the apparatus) to allow attached measurement sensors to communicate with, for example, an associated interface. Visual indicators (e.g. LEDs or a display) may be provided to indicate the status of the apparatus (e.g. whether it is located in the operative or stowed position and whether the motor is energised).

The apparatus may also comprise one or more sensors attached to the arm member. As explained above, the sensor may be removably attached to a sensor mount of the arm member. The sensor is preferably a standalone or separate sensor that is moved by the arm member into and out of the operative position. The arm member is preferably stationary whilst the sensor takes a measurement. The arm member is preferably been moved into the operative position prior to the sensor taking a measurement. The attached sensor(s) may include a measurement probe having a deflectable stylus. For example, an analogue or touch trigger measurement probe may be provided. The attached sensor(s) may comprise a tool measurement sensor. The tool measurement sensor may be a contact-based tool measurement sensor that has a deflectable stylus (e.g. having a disk, cube or the like at its distal end). The tool measurement sensor may be a non-contact sensor. For example, an optical or laser-based tool measurement sensor. The measurement sensor may be a break-beam laser tool setter, such as the NC4 system sold by Renishaw plc, Wotton-Under-Edge, UK. The measurement sensor may be a reflective tool measurement device, such as the TRS2 system also sold by Renishaw plc. The apparatus may also comprise a protective housing or pocket for the sensor when it is moved into the stowed position.

Also described herein is a motorised measurement arm apparatus. The apparatus may be configured for use on a machine tool. The apparatus may include a base for attachment to the machine tool. The apparatus may include an arm member extending from the base. The arm member may be configured for holding one or more sensors. The arm member may be moveable relative to the base. Such movement may include movement to a stowed position. Such movement may include movement to an operative position. The operative position may be defined by engagement of a mechanical stop arrangement. A motor may be provided for moving the arm member relative to the base. A motor controller may be provided for energising the motor to move the arm member relative to the base. The motor controller is configured to energise the motor when the arm member is in the operative position to maintain engagement of the mechanical stop arrangement. The motor controller may be configured to supply a holding current to the motor when the arm member is in the operative position to maintain engagement of the arm member with the mechanical stop. The holding current may be less than the drive current used to move the arm member. Any one or more of the other features described herein may also be provided.

A method of operating motorised measurement arm apparatus for a machine tool is also described, the apparatus comprising a base for attachment to the machine tool, an arm member extending from the base for holding one or more sensors, the arm member being moveable relative to the base between a stowed position and an operative position, the operative position being defined by engagement of a mechanical stop arrangement, and a motor for moving the arm member relative to the base, the method comprising the step of energising the motor when the arm member is in the operative position to maintain engagement of the mechanical stop arrangement. The method may also include any of the features described with reference to the analogous apparatus.

Figure 3C:
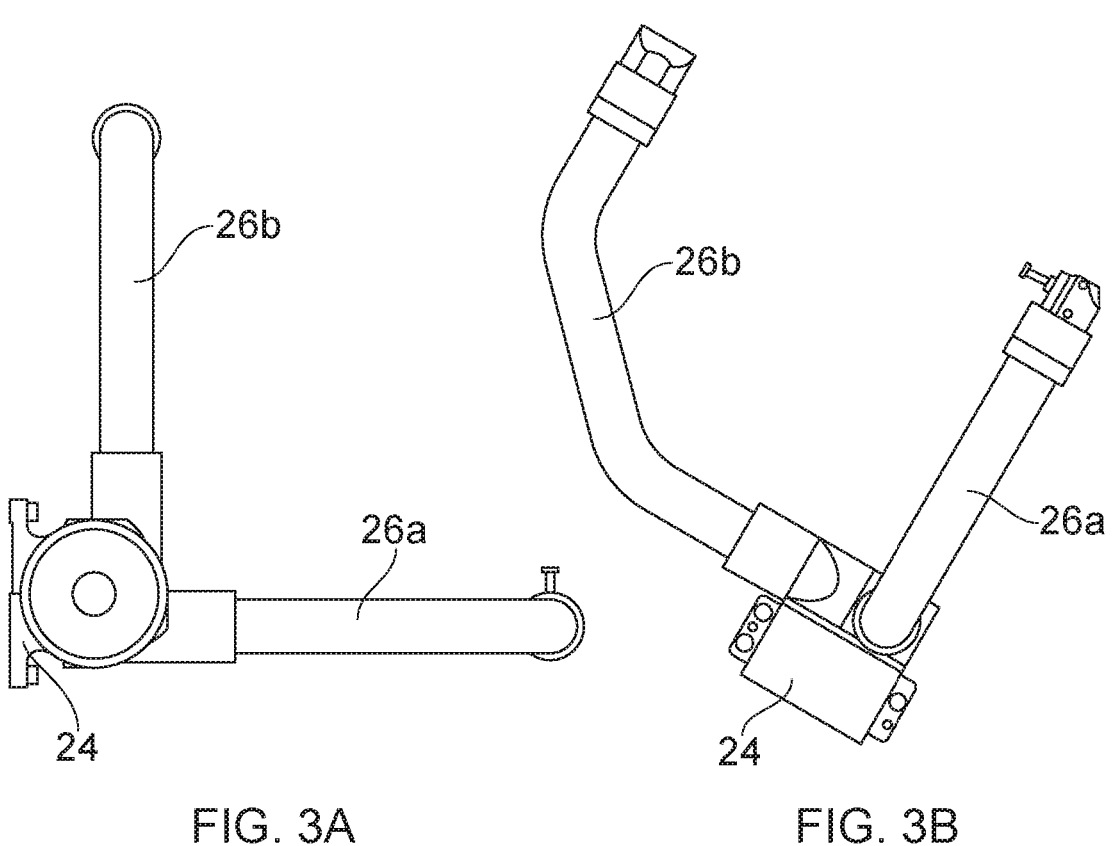
Figure 3C:
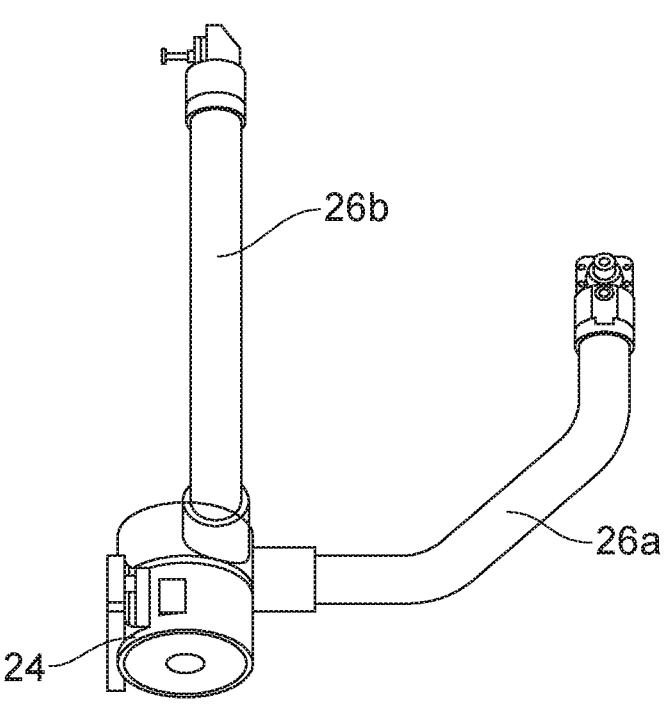
Figure 4:
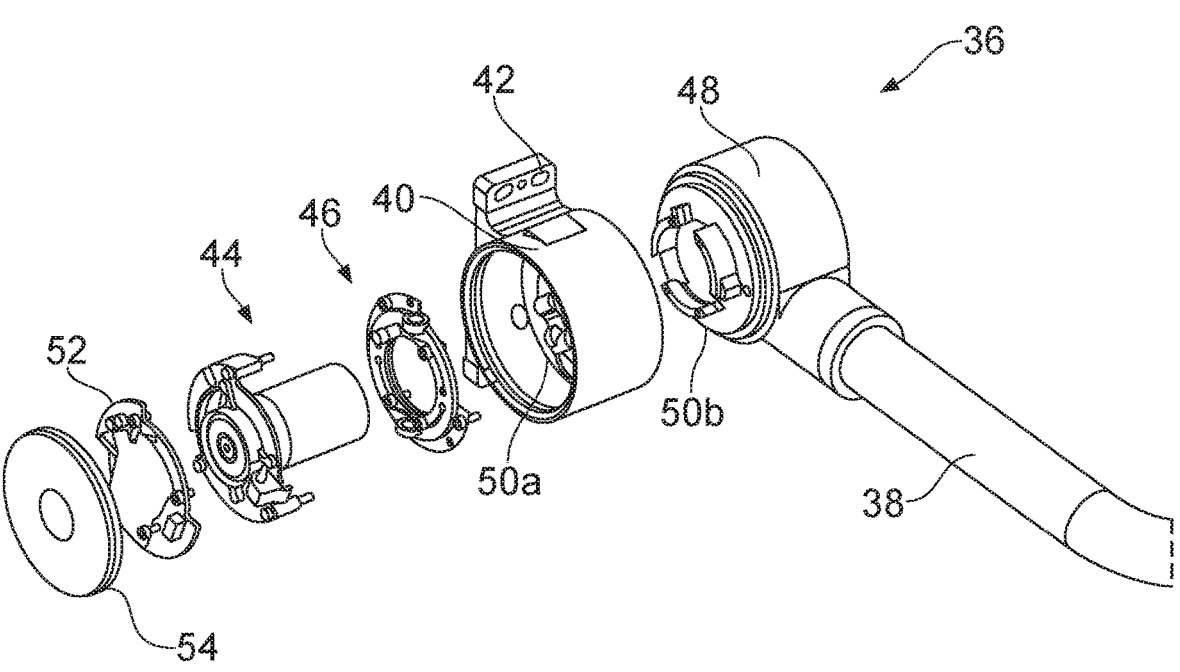
Figure 5:
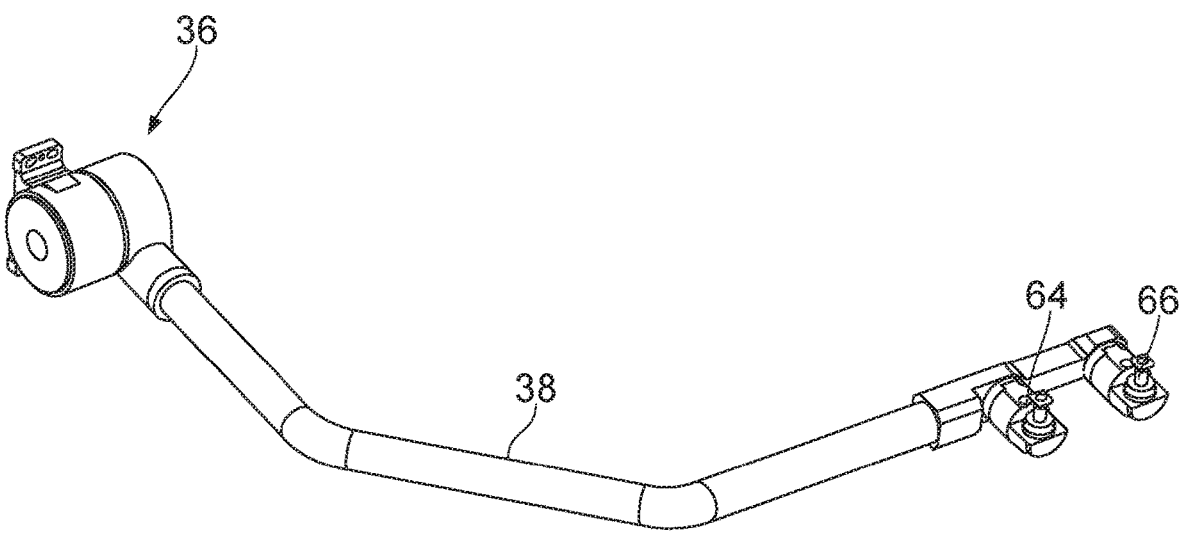
Figure 6:
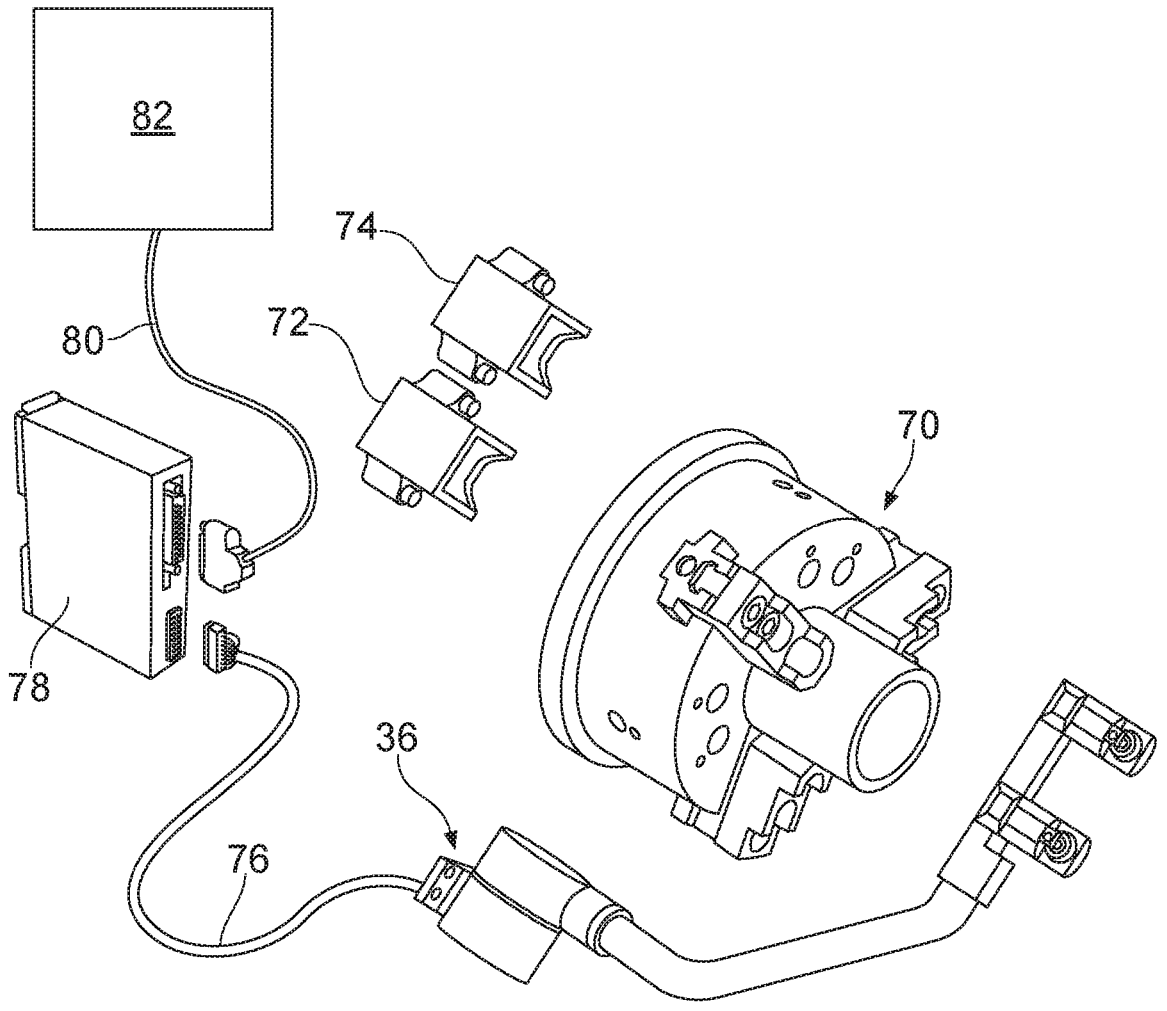
Figure 7:
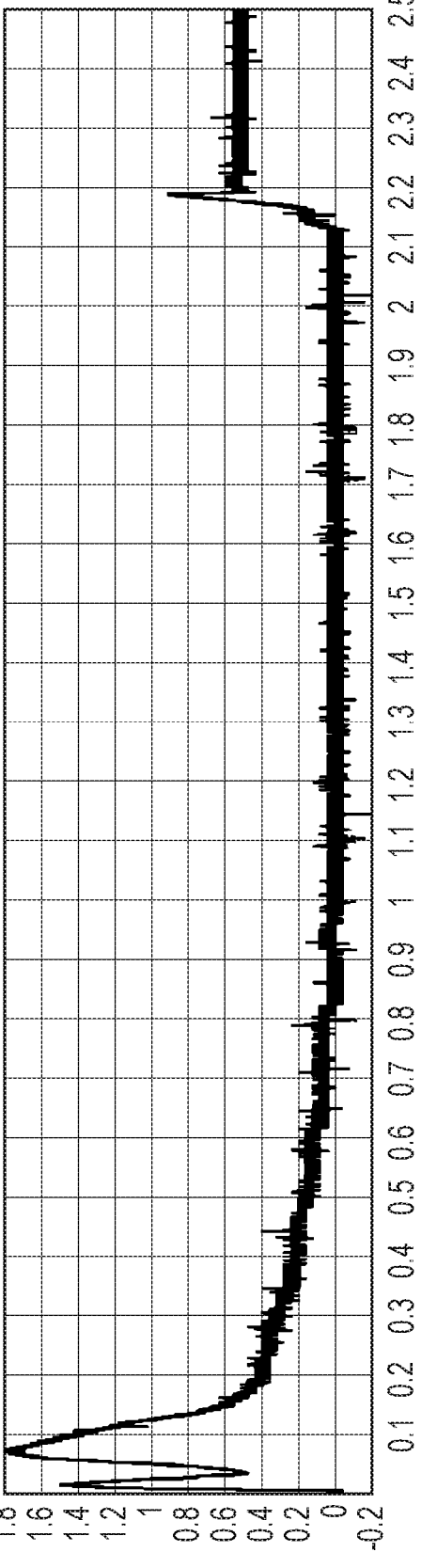
Figure 8:
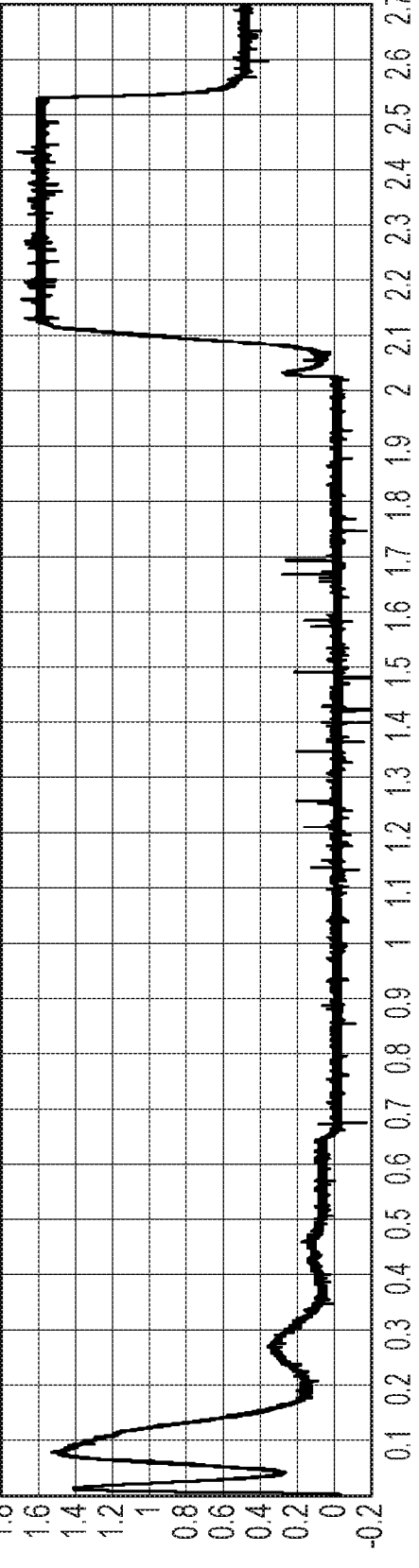
Figure 9:
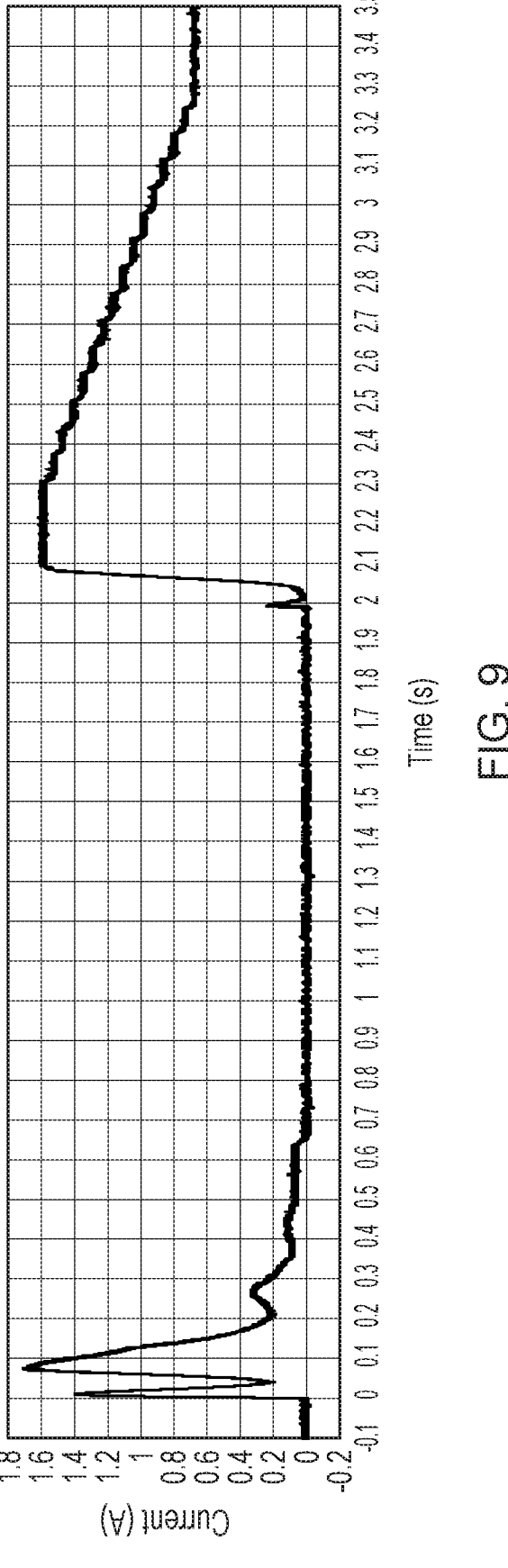

The invention will now be described, by way of example only, with reference to the accompanying drawings in which;

FIG. 1 illustrates a motorised arm apparatus of the present invention,

FIG. 2 illustrates the motorised arm apparatus of FIG. 1 installed on a lathe, FIGS. 3A to 3C are different views of a motorised arm apparatus of the present invention, FIG. 4 is an exploded view of the base end of the motorised arm apparatus, FIG. 5 shows a variant of the motorised arm apparatus for holding two sensors, FIG. 6 illustrates the motorised arm apparatus installed on a lathe, FIG. 7 shows the change in motor current versus time for a first controlled movement into the operative position, FIG. 8 shows the change in motor current versus time for a second controlled movement into the operative position, and FIG. 9 shows the change in motor current versus time for a third controlled movement into the operative position.

Referring to FIG. 1, a motorised arm apparatus 2 is schematically illustrated. The motorised arm apparatus comprises a base 4 and a moveable arm member 6. The proximal end of the arm member 6 is attached to the base 4 via a hub 8 that enables rotation of the arm member 6 relative to the base 4. A tool-setting probe 10 is attached to the distal end of the moveable arm member 6. A motor (not shown) is provided within the base 4 to drive rotation of the moveable arm member 6 about the axis R via a planetary gearbox (not shown) that can be back-driven. The moveable arm member 6 is illustrated in FIG. 1 in the operative or "arm ready" position, but as will be explained below it can be rotated away from that operative position into a stowed or inoperative position.

The motor used to drive rotation is a brushless DC motor with built-in hall sensors that allow motor rotation to be measured. In particular, the hall sensor pulses that are generated provide a direct measurement of the amount of motor rotation and hence arm member 6 movement. In the present embodiment, the arm member 6 can rotate through 90° from the illustrated operative or "arm ready" position to a stowed position (that is not shown in FIG. 1). The gearbox ratio is 216:1 and there are eight hall sensor pulses per motor revolution which thus provides 432 hall sensor pulses when the arm sweeps from the operative position to the stowed position. Counting the Hall pulses and timing the gap between them enables information on arm position and speed to be determined (e.g. by a motor controller as described below).

Referring additionally to FIG. 2, there is shown the motorised arm apparatus 2 mounted to a lathe. It could, of course, be mounted to any other type of machine tool. The lathe comprises a chuck 12 for holding a workpiece and a tool holder 14 carrying multiple cutting tools 16 for cutting a workpiece (not shown) held in the chuck 12. The motorised arm apparatus 2 is shown in FIG. 2 in the operative or "arm ready" position that places the tool-setting probe 10 in a location within the working volume of the lathe that enables measurement of one or more of the cutting tools 16. It can, however, be seen that the tool-setting probe 10 would obstruct the cutting process if it remained in such an operative position. Prior to performing a cutting process, the motorised arm apparatus 2 is thus activated to rotate the moveable arm member 6 into the stowed position. Although not shown in FIG. 2, moving to the stowed position involves rotating the arm member until the tool-setting probe 10 is located or docked within the protective storage box 18. The lathe can then cut a workpiece held in the chuck 12 unhindered by the tool-setting probe 10.

A motor controller is provided to control the motor and to interface with the numerical controller of the lathe. In the present embodiment, the motor controller is provided by the combination of circuitry within a separate interface box and a circuit board incorporated within the base 4 (the circuit board within the base being linked to the circuitry in the interface box by a cable). However, the skilled person would appreciate the motor controller could be implemented in a variety of different ways; e.g. all of the motor controller electronics could be included in the base or as interface circuitry that is separate to the base. Furthermore, wired or wireless connections could be provided between any distributed components of the motor controller. The motor controller is arranged to activate the motor (i.e. by supplying appropriate electrical power) to move the arm member between the operative and stowed positions as and when required. In particular, the motor controller controls and monitors the drive signals (e.g. drive current) applied to the motor and receives the hall sensor pulses that are output by the motor (i.e. to measure the rotation speed and the extent of rotation). The motor controller is also arranged to receive instructions from the numerical controller of the lathe. The motor controller can move the arm member from the stowed position to the operative position on receipt of an instruction indicating a tool is to be measured and can return the arm member to the stowed position on receipt of an instruction indicating measurement is no longer required.

It can thus be seen that there is a need to repeatedly move the arm member into and out of the operative position each time a tool measurement is required. This tool measurement may take place at certain times during each cutting procedure, between each cutting operation or periodically (e.g. when significant tool wear is likely to have occurred or when setting up at the start of a job). It is therefore important that the operative position, and hence the location of the tool-setting probe 10 within the local coordinate system of the lather, is as accurately and repeatably defined as possible. This is because any errors or deviations in the operative position that is adopted for each measurement will feed through into a tool measurement error which in turn introduces a corresponding cutting error into the dimensions of workpieces being made by the lathe.

As mentioned above, prior art motorised arms typically use an accurate (e.g. kinematic) mechanical stop arrangement in combination with a spring mechanism to provide the operative position after the arm member has been driven to such a position by the motor. However, the present inventors have realised that relying only on such a mechanical spring force does not always result in a sufficiently repeatable operative position being attained.

The motor controller of the present apparatus is thus configured to apply a holding current to the motor when the moveable arm member has reached the operative position. This holding current acts to maintain engagement of the mechanical stop arrangement, even in the presence of heavy vibration, if a heavy sensor is being carried by the arm, or if the arm is mounted at an unfavourable orientation with respect to gravity (e.g. upside down). This holding current is selected to generate enough torque to keep the mechanical stop tightly engaged without causing damage to, or excessive heating of, the motor. As explained in more detail below, it is preferable to apply a holding current to the motor when the mechanical stop is engaged that is less than a drive-in current that is initially applied when the arm member is moved into the operative position (thereby engaging the mechanical stop). A number of alternative transitions from the drive-in current to the holding current are described below. As also explained below, the apparatus may also implement a controlled slow-down as the arm approaches the end of the sweep (e.g. as it reaches the operative or stowed position). This slow-down may improve the aesthetics (i.e. it prevents a loud "clunk" when the desired position is reached), reduce wear (e.g. of parts of the mechanical stop arrangement) and minimise arm vibrations (e.g. bounce back oscillations) upon reaching the end stop.

The motor controller can also implement other functions. As explained above, in the present embodiment the motor controller may monitor the speed of motion or the position of the arm member. The motor controller may also monitor the current being supplied to the motor. The motor controller may use either or both of these measurements to provide additional functionality to help users of the apparatus. Example of these are outlined below.

Firstly, if the arm member is found to be moving faster than expected (e.g. because someone is pushing it) or too slowly (e.g. because someone is trying to stall it or it has collided with an object) then the motor can be de-energised. The moveable arm can then be moved manually without having to overcome the force applied by the motor. This would allow, for example, a user to manually move the arm to the required position and/or prevent damage if contact has been made with an obstruction. A warning signal may be issued (e.g. to the numerical controller of the lathe and/or directly to the user via an alarm etc) if such an event occurs.

If the arm member is being held in the operative position by the holding current, the position of the arm member (i.e. as measured by the encoder) may be monitored. Although vibrations and shocks may cause transient changes in the position, the motor controller is arranged to disengage the motor if the arm member appears to have been manually actuated a small amount (e.g. as measured by the encoder incorporated into the motor). This then allows the arm member to be stowed away manually by a user. This ability to manually move the arm member is useful during initial installation and also if there is a control malfunction. If the arm member is manually moved back to the operative position, the holding current can then be re-engaged. However, it is preferred that any return to the operative position is performed under motorised control to ensure a repeatable operative position is obtained.

As explained above, the motor controller may receive commands from, and issue status signals to, the numerical controller of the host machine (i.e. the lathe in the present example). For example, the apparatus may issue an "arm ready" signal when in the operative position. A "machine ready" signal may also be issued when the arm member is in the stowed position. The position adopted by the arm member may be measured by counting the pulses issued by the Hall sensors within the motor, or a separate position encoder may be provided to measure the angle of arm member rotation relative to the base. There may also be one or more reed switches or the like to indicate a certain position (e.g. the operative or stowed position) has been reached.

There may also be diagnostic and status indications provided with the apparatus. For example, one or more LED's may be provided on the interface board, with light pipes going to the outside of the interface box. In one example, red flashing LEDs may be used to indicate the arm member has stopped in the operative or stowed positions based on the angle count derived from the Hall sensor pulses, but that no reed switch activation is detected (suggesting a faulty reed switch). A Red/Blue flashing LED may indicate a motor drive problem and a solid Yellow LED that the arm member has stopped in uncontrolled position, either due to a move command being altered during motion or as a result of a manual move (arm pulled or pushed). A Yellow LED slow flash may indicate the arm member has been stopped in an uncontrolled position after a commanded move because the movement speed is too slow (e.g. indicating a stall/collision). A Yellow LED fast flash may indicate the arm member has stopped in an uncontrolled position after a commanded move because the movement speed is higher than expected (e.g. indicating it has been manually accelerated, or pushed). A Blue flashing LED may indicate the moveable arm has powered up into an unknown position (i.e. the moveable arm was not properly stowed when switched on, possibly indicating possible obstruction in the probe pocket). A Green solid LED may indicate the power is on and everything is working as expected.

Referring next to FIGS. 3A to 3C, a variant of the motorised arm apparatus of the present invention is illustrated in the operative and stowed positions. FIG. 3A is a side view of the apparatus showing the base 24 with the arm member in the operative and stowed positions. The arm member is labelled as 26a when shown in the operative position and as 26b when in the stowed position. FIG. 3B shows the same apparatus but viewed from above and FIG. 3C shows a perspective view.

Referring next to FIG. 4, an exploded view of the base 36 and the proximal end of the moveable arm 38 is shown. The base includes a casing 40 having bolt holes 42 for securing it to a machine tool. A motor, gearbox and mounting structure 44 is provided that fits through a central aperture in a spring and detent plate 46. The proximal end of the moveable arm 38 is attached to a hub 48 that can rotate relative to the casing 40. Corresponding protrusions 50a and 50b on the casing 40 and hub 48 respectively provide the mechanical stop arrangement that defines the operative position (i.e. in a similar manner to that described in U.S. Pat. No. 6,519,863). Motor control electronics 52 are also included within the structure, protected by an end cap 54.

Referring to FIG. 5, the assembled base 36 and entire moveable arm member 38 of FIG. 4 is shown. The moveable arm member 38 is broadly L-shaped and has two sensor mounts 64 and 66 near its distal end. In FIG. 5, generic tool sensors are shown attached to the sensor mounts. In a preferred embodiment, the sensor mounts 64 and 66 may be arranged to retain the transmit and receive modules of a non-contact tool setting device. Alternatively, two separate sensors may be mounted to the arm member 38.

Referring to FIG. 6, the above described apparatus is illustrated when installed on a lathe. In particular, the apparatus described above with reference to FIG. 5 is illustrated when mounted for measuring tools that are used to cut workpieces held in the chuck 70 of a lathe. The arm member is shown in the operative position and sensor pockets 72 and 74 are also shown in which the sensors carried by the arm member will be located when it is moved into the stowed position. As explained above with reference to FIG. 4, motor control electronics 52 are provided within the base 36. These motor control electronics are connected by a cable 76 to additional motor control electronics provided within an interface box 78. This interface box 78 is connected by a further cable 80 to the numerical controller 82 of the lathe. The electronics within the interface box 78 and the motor control electronics 52 within the base 36 together form a motor controller that operates the arm apparatus, on receipt of appropriate control instructions from the numerical controller 82 of the lathe.

Referring next to FIGS. 7 to 9, further details will be provided about how the motor is controlled by the motor controller as it moved from the stowed to the operative position.

Referring first to FIG. 7, the motor drive current (in amps) is shown as a function of time (in seconds) as the moveable arm is driven by the motor from the stowed position to the operative position. As can be seen from the graph, there are peaks in current for the first 0.2 seconds before the drive current drops off as the arm moves with the help of gravity towards the operative position. After about 2.1 seconds the mechanical stop arrangement makes initial contact and the motor stalls causing an increase in motor drive current. The motor controller is arranged to detect when the drive current increases in this manner (i.e. due to mechanical stop arrangement making initial contact) and thereafter applies a holding current limit of approximate 0.55 A.

It is noted that there is a drive current peak of around 1 A before the holding current limit is applied, but the magnitude of this peak has been found to be slightly inconsistent. Although acceptable positional accuracy was attained, there was found to be a slight inconsistency in motor stall position. This rapid switch to the holding current also occurred while the arm tube was still visibly resonating and in certain circumstance the motor was found to relax back to a slightly variable position after switching to the holding current. This arrangement does not, however, require the position of the arm member to be measured during rotation into the operative position.

FIG. 8 shows the motor drive current (in amps) as a function of time (in seconds) as the moveable arm is driven by the motor from the stowed position to the operative position. In this example, the motor controller also monitors the position of the arm member from the pulses generated by the Hall sensors of the motor. The motor controller uses the measured arm member position to determine when there should be initial engagement of the mechanical stop arrangement, which is confirmed by an increase in the time between each Hall sensor pulse. In particular, the motor controller applies a so-called drive-in current of around 1.6 A when the arm member has moved to a position where there is initial engagement of the mechanical stop arrangement. This drive-in current is held for around 500 ms before a lower holding current limit of around 0.5 A is applied. The holding current is maximised whilst being kept below the thermal dissipation limit of the motor and its surroundings. Applying the drive-in current for a short period (e.g. circa 500 ms) has been found to allow the amplitude of arm resonance to reduce before the lower holding current is applied.

Applying such a controlled drive-in current has been found to result in a consistent torque on the kinematics of the mechanical stop arrangement and a consistent drive-in position is attained. Holding the drive-in current for a short period also allows any arm member vibrations to attenuate, thereby reducing the tendency for the arm member to relax backwards. However, when the drive current rapidly drops from the drive-in to holding current (i.e. from 1.6 A to 0.5 A) there can be a slight shock that causes the motor and gearbox to back-drive slightly (e.g. by no more than approximately one quarter of a motor turn). This can reduce the push-in torque on the kinematics of the mechanical stop arrangement and provides a slight variability in the final settling position of the motor (e.g. approx. $\frac{1}{16}$th of a motor turn). Although small, this can manifest as a few microns' variability in the position of the end of the moveable arm.

FIG. 9 again shows the motor drive current (in amps) as a function of time (in seconds) as the moveable arm is driven by the motor from the stowed position to the operative position. In this example, the motor controller again monitors the position of the arm member from the pulses generated by the Hall sensor of the motor to establish when there is initial engagement of the mechanical stop arrangement (i.e. by detecting when the Hall pulses become less frequent). In this example, the motor controller applies an initial drive-in current of around 1.6 A for a few hundred milliseconds when the arm member first engages the mechanical stop arrangement. However, the transition from the drive-in current to the lower holding current (about 0.65 A) is not abrupt but instead comprises a steady ramp-down over a period of 1 second or so. This ramp-down provides a gentle release without any resulting back-winding of the motor, rather than the abrupt drop described above with reference to FIG. 8.

The arrangement described with reference to FIG. 9 has been found to provide a consistent drive-in position, which doesn't change after transitioning to the holding current. The high drive-in torque is also maintained, resulting in firm kinematic engagement and improved repeatability.

It should be remembered that the above examples are merely preferred embodiments of the invention and the skilled person would be aware of many variants and alternatives. For example, a lathe is just one example of a machine tool and the arm apparatus may be used with any machine tool. The use of a rotary jointed arm is also merely an example and other motion (e.g. linear motion) of an arm relative to its base is possible. Any sensor may be attached to the moveable arm member, not just tool measurement devices. Variants of the apparatus may also be provided to carry different loads or sensor or to work in different operating environments.

The invention claimed is:

1. A motorised measurement arm apparatus for a machine tool, the apparatus comprising
   a base for attachment to the machine tool tool;
   an arm member extending from the base for holding one or more sensors, the arm member being moveable relative to the base between a stowed position and an operative position, the operative position being defined by engagement of a mechanical stop arrangement:
   a motor for moving the arm member relative to the base; and
   a motor controller for energising the motor to move the arm member relative to the base,
   wherein the motor controller is configured to:
   energise the motor when the arm member is in the operative position to maintain engagement of the mechanical stop arrangement;
   supply a drive-in current to the motor for a first time period after initial ngagement of the mechanical stop arrangement during movement of the arm member into the operative position:
   supply a holding current to the motor after the first time period to maintain engagement of the mechanical stop arrangement, the holding current being less than the drive-in current; and
   reduce the current supplied to the motor from the drive-in current to the holding current over a second time period.

2. The apparatus according to claim 1, wherein the motor controller is configured to ramp down the current supplied to the motor from the drive-in current to the holding current over the second time period.

3. The apparatus according to claim 1, wherein the mechanical stop arrangement comprises a first portion attached to the arm member and a second portion attached to the base, the first and second portions being arranged to adopt a repeatable relative position when brought into engagement.

4. The apparatus according to claim 3, wherein the first and second portions provide, when engaged, a kinematically defined relative position.

5. The apparatus according to claim 1, wherein the motor comprises a brushless, direct current (DC) motor.

6. The apparatus according to claim 1, wherein the arm member is attached to the base by a rotary joint.

7. The apparatus according to claim 6, comprising a rotary encoder to measure rotation of the arm member relative to the base.

8. The apparatus according to claim 7, wherein the motor includes an integrated rotary encoder to measure an amount of motor rotation.

9. The apparatus according to claim 8, wherein the motor controller is configured to monitor the output of the rotary encoder and determine therefrom if there are any changes in position or speed of movement of the arm member that are indicative of an external force being applied to the arm member.

10. The apparatus according to claim 9, wherein the motor controller is configured to de-energise the motor if an external force is applied to the arm member.

11. The apparatus according to claim 6, wherein the base comprises a housing that houses the rotary joint, the motor and the mechanical stop arrangement.

12. The apparatus according to claim 1, comprising a gearbox connecting the motor to the arm member.

13. The apparatus according to claim 1, wherein the base comprises an attachment mechanism for securing the apparatus to the machine tool and at least one sensor mount is provided at a distal end of the arm member.

* * * * *